June 2, 1931. J. A. DIENNER 1,808,023
LIQUID LEVEL INDICATOR
Filed Feb. 5, 1923
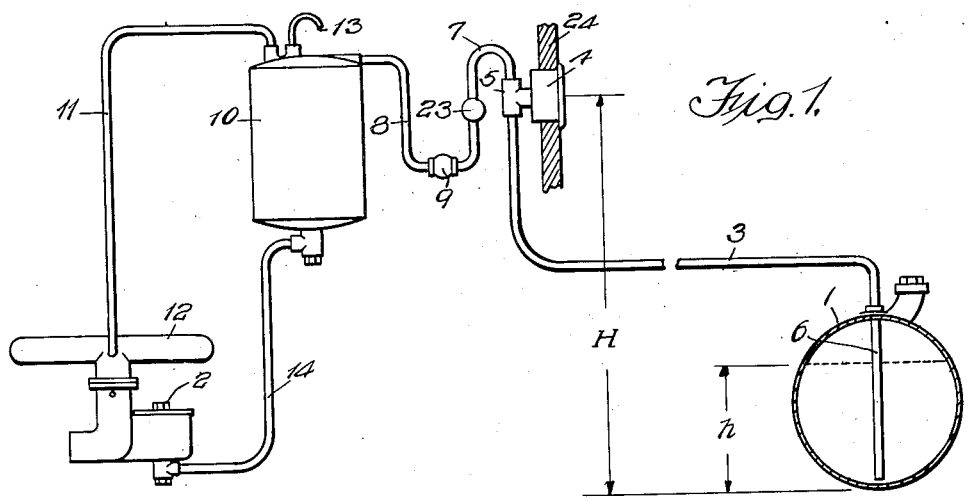
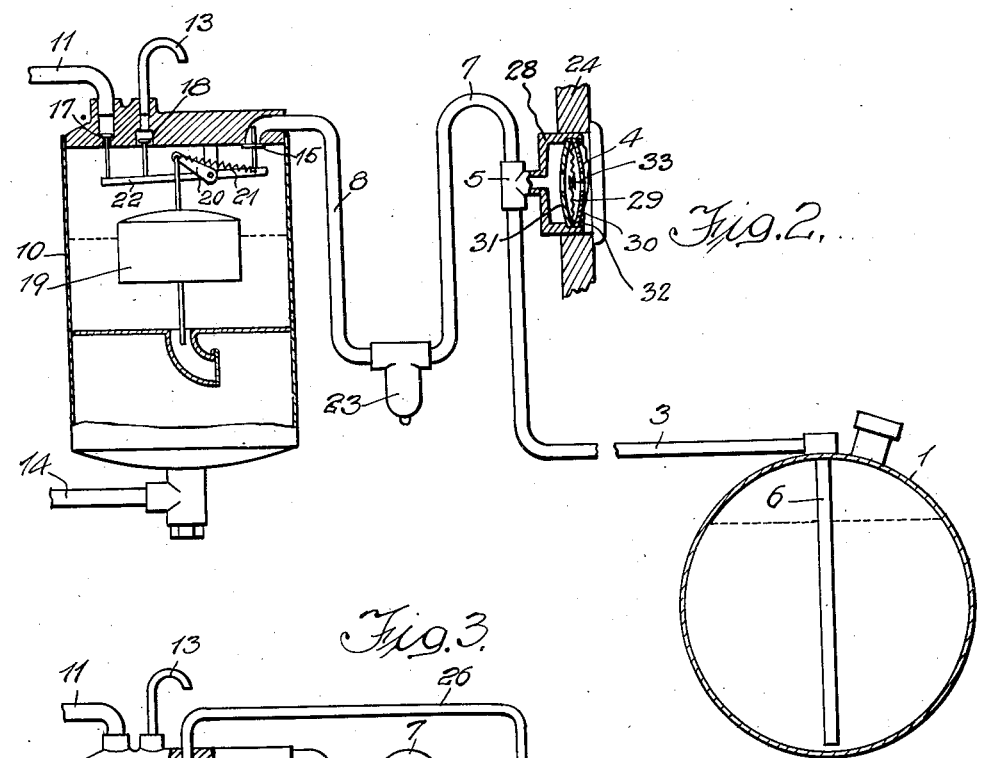
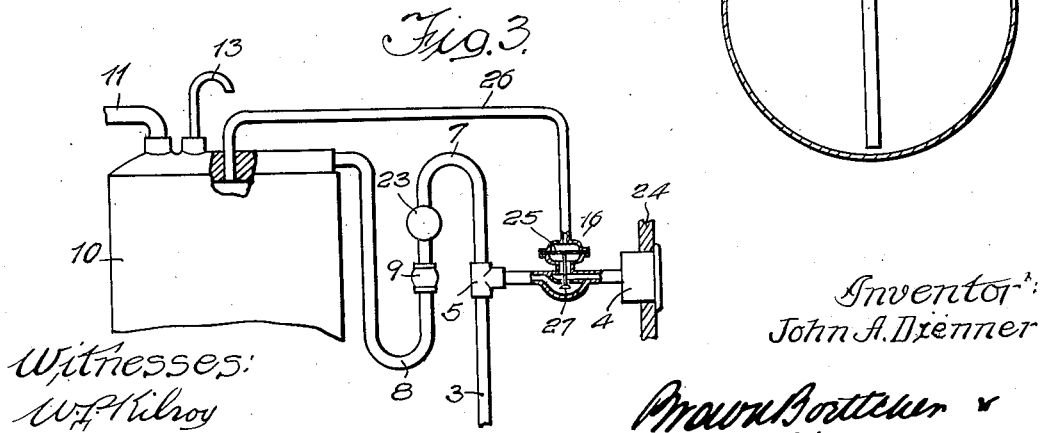
Inventor:
John A. Dienner Patented June 2, 1931

1,808,023

UNITED STATES PATENT OFFICE

JOHN A. DIENNER, OF CHICAGO, ILLINOIS, ASSIGNOR TO BENDIX STROMBERG CARBURETER COMPANY, OF CHICAGO, ILLINOIS, A CORPORATION OF ILLINOIS

LIQUID LEVEL INDICATOR

Application filed February 5, 1923. Serial No. 616,900.

My invention relates to indicators for indicating the level of liquid in a tank or the quantity of liquid in the tank and is particularly useful in connection with automobiles for indicating upon the instrument board the contents of the gasoline tank at the rear. The invention is not to be limited solely to this purpose.

My invention proceeds upon the principle that the height of a column of liquid may be measured in terms of the difference in pressures which will sustain the column.

Whereas in my prior copending application Serial No. 488,741, filed July 30, 1921 I have disclosed the same basic principle and mode of operation particularly with respect to the employment of the suction feed line as the means for providing and maintaining the column of liquid to be measured, it is to be noted that in some of the constructions therein disclosed I have provided means for maintaining an artificial level of the liquid at a point below the pressure operated indicator. I find that in practice the level is difficult to maintain. The chief reason for this is the effect of the high engine suction which is superposed upon the suction due to the column of liquid itself when the system operates to draw the liquid from the main tank. Now according to the present improvement I provide means for maintaining a solid column of liquid from the main tank to the indicator. This I secure preferably by leading the vacuum feed pipe directly from the main tank to the indicator and then from there to the top of the vacuum feed tank with a liquid trap and a gas trap between the indicator and the vacuum tank. If desired the indicator may be cut off from the vacuum line during the time that engine suction is imposed upon said line. This prevents the engine suction from acting upon the diaphragm or other pressure element of the indicator. This cut-off is not necessary as in the preferred form I provide stop plates on each side of the sensitive diaphragm of the indicator to protect it against damage and let the needle of the indicator go off scale while the vacuum tank is working. Such stop plates are advisable upon both sides of the sensitive diaphragm to protect not only against injury due to engine suction during normal operation but also to prevent possible damage from pressure in the main tank such as might be caused by careless filling.

In order to acquaint those skilled in the art with the manner of constructing and operating my invention, I shall now describe a specific embodiment of the same in connection with the accompanying drawings in which:

Fig. 1 illustrates diagrammatically one form of my invention.

Fig. 2 is a similar view of a modified form in which the vacuum tank is provided with a valve for closing the upper end of the feed line when the vacuum tank is filled and engine suction is cut off from the vacuum tank and;

Fig. 3 is a fragmentary diagrammatic view of a modification in which a suction actuated cut-off valve for the indicator is provided.

In the several figures the same reference characters indicate the same or similar parts.

Referring to Fig. 1, the main automobile gasoline tank 1 which is carried below the level of the carbureter 2 which it supplies, is provided with a suction feed line 3 extending directly to the indicator 4 through a T connection 5. The indicator 4 is mounted on the instrument board 24 of the automobile. The lower end of the feed pipe extends in substantially a vertical run 6 to the bottom of the main tank 1.

The suction main or feed line 3 proceeds upwardly above the T connection 5 to form a gas trap 7. This gas trap is shown as consisting merely of the upward loop of the feed pipe 3 but it will be understood that the size and form of the trap may be varied.

From the gas trap 7 the feed line 3 proceeds in a downward loop or dip forming a liquid trap 8. As indicated at 9, a check valve is put in the bend of pipe 8 which forms the liquid trap. In Fig. 1 the check valve is shown at the bottom of the bend while in Fig. 3 it is shown in the right leg of the bend. In either event it is placed on the vacuum tank side of the T connection 5 and preferably at such a point that the liquid in the left leg of the bend seals the check valve.

The left leg of the liquid trap 8 communicates with the interior of the vacuum tank 10. The vacuum tank 10 communicates by valved pipe 11 with a suitable source of suction as for example the intake manifold 12 of the engine to which the carbureter 2 is connected. The tank 10 communicates through the valved pipe 13 with atmosphere. The bottom of tank 10 communicates with the float chamber of carbureter 2 by way of pipe 14 in a manner well understood by those skilled in the art. In fact the tank 10 indicated in the drawings is the standard Stewart-Warner vacuum feed tank at present supplied to the market. This tank is modified in Figs. 2 and 3 for the special purpose of closing off the liquid feed line by additional valve 15 in Fig. 2 and for providing an actuating connection for the cut-off valve 16 in Fig. 3.

Referring again to Fig. 1 the operation of this form of the invention is as follows:

When the vacuum tank acts under engine suction to draw liquid from tank 1 the engine suction prevails at the upper end of feed pipe 3 while atmospheric pressure prevails upon the surface of the liquid into which the lower end of pipe 6 dips. Liquid is therefore drawn into tank 10 until the float therein is raised and the engine suction cut off and the interior of the tank connected to atmosphere as is well understood by those skilled in the art. When this occurs the feed pipe 3 and its various parts stands full of liquid. Return flow to the tank 1 which now tends to occur is checked by the check valve 9 which opens toward the vacuum tank 10 but checks downward flow of liquid. The liquid tending to drop back creates a drop in pressure below atmospheric pressure. This tendency to drop depends upon the height H which is constant and the height of the liquid in the tank 1 indicated as h which is variable. Hence the indicating instrument 4 may be set to indicate the variable height h in terms of either height or quantity.

Any leakage of air or other gas or vapor tends to rise into the gas trap 7 and will not disturb the reading. Leakage of liquid at the check valve 9 must first empty the liquid trap 8 before it permits the entry of gas; and even then enough gas must leak in to fill the trap 7 before any effect upon the indication occurs.

The indicator is merely a suction actuated indicator. I preferably employ a diaphragm actuated indicating pointer. When the heavy engine suction is impressed upon this diaphragm the needle goes off scale, thereby indicating the actuation of the vacuum tank. As previously stated I preferably put a stop plate upon each side of the diaphragm to prevent injury to the diaphragm or connected parts by excessive difference of pressure as shown in Fig. 2. The indicator 4 comprises a casing 28, the interior of which communicates with the adjacent leg of the T 5. The front part of said casing is closed by a flexible diaphragm 29, the edges of which are clamped between the edges of stop plates 30 and 31 by means of a clamp ring 32. The diaphragm has a stem 33 connected to the indicating hand of the indicator in any suitable manner, as is well known to those skilled in the art. This stem passes through an aperture in the plate 30. The back plate 31 is apertured to permit changes in pressure to operate upon the diaphragm 29, the front face of which is in communication with atmosphere. Referring to Fig. 2 it will be seen that I provide an additional valve 15 in the Stewart-Warner tank to cut off the suction line 3 when the valves 17 and 18 are thrown to cut off suction and to admit atmospheric pressure respectively. The float 19 operates upon an independently movable arm 20 and through spring 21 cause snap actuation of valve arm 22 as is well understood by those skilled in the art.

The operation of the system is the same as previously described in connection with Fig. 1 except that the valve 15 now performs the function of check valve 9. However valve 15 is not liquid sealed as is valve 9. It has the advantage however of not serving as a lodging place for sediment since it is regularly opened and flushed. For the short periods between actuation of the tank 10 the valve 15 shows no leakage. The valves 15 and 9 may be used conjointly if desired. If a gasoline filter 23 is used it should be connected on the upper side of the connection 5 and preferably in the right leg of the liquid trap 8 in advance of the check valve 9. Here it may perform the dual purpose of preventing excessive suction upon the indicator 4 and of filtering out impurities to prevent clogging of valve 7. In fact the valve 9 and filter 23 may be combined into a single unit.

In Fig. 3 I have shown a cut-off 16 for indicator 4. This cut-off 16 comprises a diaphragm 25 the top side of which as shown communicates through pipe 26 at all times with the interior of the feed tank 10. The bottom of diaphragm 25 communicates at all times with indicator 4. A valve 27 is connected to diaphragm 25 and cuts the diaphragm 25 and the indicator head 4 off of the T connection 5 when said valve 27 is closed.

The operation of the system is in general the same as described in connection with Figs. 1 and 2. However, instead of depending merely upon the back stop plate to protect the diaphragm of head 4 against injury when the engine suction acts upon feed line 3 the diaphragm 25 is subjected to greater suction upon its top side than upon its bottom side due to the fact that pipe 26 contains only air while feed pipe 3 contains liquid and therefore the diaphragm 25 closes the valve 27 as soon as suction is imposed upon the tank 10.

Similarly in filling the main tank, if any excessive pressure is imposed upon the feed line 3 the diaphragm tends to close the valve 27 and shut it off from indicator 4.

While I have referred to the Stewart-Warner tank it is to be understood that any device of the same general character controlling the application of suction to the feed line 3 may be employed.

It will further be seen that if any artificial level of liquid does occur in the present system it occurs in gas trap 7 above the significant column of liquid and the indicator 4 and hence variations of the same do not have any effect upon the indication. I do not intend to be limited to the details shown or described.

I claim:

1. In combination, a main tank, a vacuum tank, a suction feed pipe between said tanks, an indicating device sensitive to difference in pressure connected to said pipe and means for holding a solid column of liquid extending from said indicating device to said main tank.

2. In combination, a main tank open to atmosphere, a vacuum tank, a suction pipe between said tanks, an indicator, a connection between the indicator and said pipe, a valve for said pipe on the vacuum tank side of the indicator connection and a gas trap also on the vacuum tank side of said indicator connection.

3. In combination, a main tank, a vacuum tank, a suction feed pipe between said tanks, an indicator, a connection in said pipe for said indicator, an automatic valve for closing off said pipe between periods of suction of the vacuum tank, said valve maintaining a solid column of liquid up to said connection and up to said indicator.

4. In combination, a main tank, a feed pipe, means for creating a flow of liquid through said feed pipe, an indicator directly connected to said feed pipe and communicating with the liquid therein and means for holding a continuous column of liquid between said indicator and said main tank, said means comprising an automatic valve in said pipe and a gas trap for said pipe above the connection of said indicator to the pipe.

5. In combination, a main automobile fuel tank, a vacuum feed tank, a feed pipe between them, an indicator mounted on the instrument board of the automobile, said indicator having connection at the rear of said board with said pipe, a valve on the vacuum tank side of said connection for preventing return flow of liquid in said pipe, and for holding a solid column of liquid between said connection and the main tank, said pipe comprising a bend extending above said connection and forming a gas trap.

6. In combination, a main automobile fuel tank, a vacuum feed tank, a feed pipe between them, an indicator mounted on the instrument board of the automobile, said indicator having connection at the rear of said board with said pipe, a valve on the vacuum tank side of said connection for preventing return flow of liquid in said pipe and for holding a solid column of liquid between said connection and the main tank, said pipe comprising a bend extending above said connection and forming a gas trap, and a second bend extending below said first bend and forming a liquid trap, said bends being disposed between the vacuum feed tank and said indicator.

7. An indicating system for automobile comprising a low level fuel supply tank, a vacuum tank, a feed pipe connected between the vacuum tank and the supply tank, an indicator disposed upon the instrument board of the automobile, said indicator having a connection with said feed pipe at the front part of the automobile remote from the main tank, and a valve for automatically holding a solid column of liquid extending in said pipe from said connection to the bottom of the supply tank.

8. In a fuel indicating system for automobiles, a low level supply tank, a vacuum tank, a feed pipe extending from the bottom of the main tank to the vacuum tank, an indicating instrument mounted on the instrument board and having a connection with the feed pipe at a point adjacent the instrument board, an automatic valve for closing said pipe against return flow, said valve being disposed on the vacuum tank side of said connection, said instrument comprising a diaphragm, and a stop plate on the back of said diaphragm to prevent injury to the instrument by excessive suction of the vacuum tank.

9. In a fuel indicating system for automobiles, a low level supply tank, a vacuum tank, a feed pipe extending from the bottom of the main tank to the vacuum tank, an indicating instrument mounted on the instrument board and having a connection with the feed pipe at a point adjacent the instrument board, an automatic valve for closing said pipe against return flow, said valve being disposed on the vacuum tank side of said connection, said instrument comprising a diaphragm, a stop plate on the back of said diaphragm to prevent injury to the instrument by excessive suction of the vacuum tank, and a stop plate in front of said diaphragm to prevent injury to the instrument by the creation of pressure in the supply tank.

In witness whereof, I hereunto subscribe my name this 2nd day of Feb., 1923.

JOHN A. DIENNER.